(12) United States Patent
Huang

(10) Patent No.: US 7,355,526 B2
(45) Date of Patent: Apr. 8, 2008

(54) ALERTING SYSTEM OF A VEHICLE DEVIATING FROM ITS TRAFFIC LANE

(76) Inventor: Chi-Jui Huang, 4 F, No. 220 Chang-Keng Tsun, Kuei-Shan Hsiang, Tao-Yuan Hsien (TW)

( * ) Notice: Subject to any disclaimer, the term of this patent is extended or adjusted under 35 U.S.C. 154(b) by 250 days.

(21) Appl. No.: 11/217,324

(22) Filed: Sep. 2, 2005

(65) Prior Publication Data
US 2006/0077070 A1   Apr. 13, 2006

(30) Foreign Application Priority Data
Oct. 7, 2004   (TW)   ................................. 93130429

(51) Int. Cl.
G08G 1/95   (2006.01)
(52) U.S. Cl. ........................ 340/907; 348/148; 340/435
(58) Field of Classification Search ................ 340/907, 340/942, 435; 348/148
See application file for complete search history.

(56) References Cited

U.S. PATENT DOCUMENTS

| 2002/0032515 | A1* | 3/2002 | Nakamura et al. | ............. 701/96 |
| 2004/0042638 | A1* | 3/2004 | Iwano | ......................... 382/104 |
| 2005/0231389 | A1* | 10/2005 | Willemin et al. | ............ 340/942 |

* cited by examiner

Primary Examiner—Benjamin C. Lee
Assistant Examiner—Shirley Lu
(74) Attorney, Agent, or Firm—Troxell Law Office, PLLC

(57) ABSTRACT

An alerting system of a vehicle deviating from its traffic lane on a highway or road is disclosed. It includes at least one left-side determining device, at least one right-side determining device and a warning device. For each side, its light intensity detector obtains a light intensity signal function first. A light intensity variation judging module makes a judge. Aft, it utilizes a misjudging preventing module to avoid the misjudging before sending out a warning signal that can activate a warning action. The advantages and functions of this invention includes having a changeable judging base depending on its environment, lowering the possibility of misjudging caused by shadow, and having several post-processing steps.

2 Claims, 9 Drawing Sheets

ALERTING SYSTEM OF A VEHICLE DEVIATING FROM ITS TRAFFIC LANE

BACKGROUND OF INVENTION

1. Field of the Invention

The present invention relates to an alerting system of a vehicle deviating from its traffic lane. Particularly, it relates to an automatic alerting system of a vehicle when it deviates from its traffic lane. The advantages and functions of this invention include: having a changeable judging base depending on its environment, lowering the possibility of misjudging caused by shadow, and having several post-processing steps.

2. Description of the Prior Art

Referring to FIGS. 1 and 2, one traditional alerting system of a vehicle on a highway can be seen as the U.S. Pat. No. 4,143,263 entitled "Highway Line Detector". Its publication date is Mar. 6, 1979. A car 80 has two sides. Each side is disposed with an illuminating element 81 and a photodetector 82 (only describing one side of the car). When this car deviates toward a white side line 92. The intensity of the reflected light becomes stronger (it means the current/voltage becomes bigger). Then, the detected current/voltage can be compared with a fixed reference value 84 (current/voltage). If the detected one is larger, then a warning signal is generated.

However, it has the following disadvantages:

[1] Its judging base is not depending on its environment. No matter it is a sunny day, a cloudy day or a rainy day, the detected electric signal is always compared with a fixed reference value 84. Thus, it is very easy to cause a misjudging. Particularly, in a brighter or a darker environment, their reflected lights are different. But, the judging base (means the reference value 84) always remains unchanged, no matter the environment becomes brighter or darker. Thus, the entire system is not reliable.

[2] The possibility of misjudging caused by shadow is too high. When there is another fast-moving car in the neighboring lane, its shadow will move over the detected area of the traditional car. So, the detected electric signal will drop down (in the shadow) and then rise up sharply (while the shadow is leaving). It could cause the misjudging of the traditional system (send out a wrong warning signal). On a highway, there are lots of cars. So, it is very possible to be influenced by any neighboring car's shadow. Therefore, the possibility of misjudging caused by shadow is too high.

[3] Lack of suitable post-processing steps. In the traditional system, the warning is just an alarm sound. In case the driver cannot quickly react or the driver suddenly becomes unconscious (due to faint, sunstroke, shock, etc.), the vehicle will deviate to one side. Finally, it causes a car accident. Even the car accident happens, there is no any automatic informing system to inform a specific person (such as police officer, family member, etc.) via telecommunication equipment.

SUMMARY OF THE INVENTION

The primary object of the present invention is to provide an alerting system of a vehicle deviating from its traffic lane. In which, it has a changeable judging base depending on its environment.

The other object of the present invention is to provide an alerting system of a vehicle deviating from its traffic lane. It significantly lowers the possibility of misjudging caused by shadow.

Another object of the present invention is to provide an alerting system of a vehicle deviating from its traffic lane. It has several post-processing steps.

DETAILED DESCRIPTION OF THE PREFERRED EMBODIMENT

Figure 1:
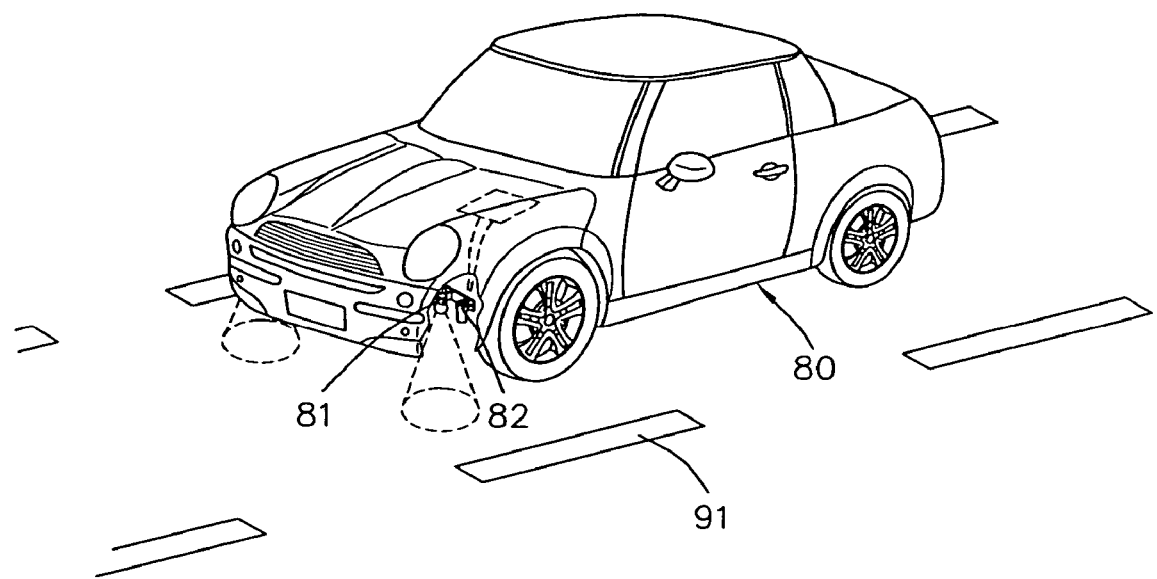
FIG. 1 is a perspective view of the traditional alerting system of a vehicle on a highway.
Figure 2:
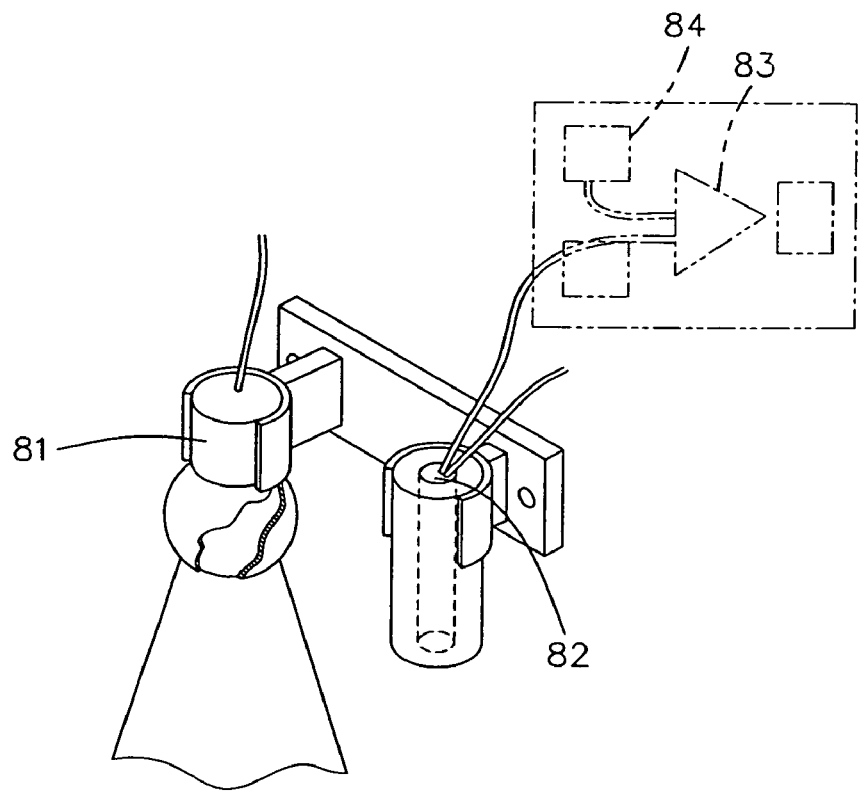
FIG. 2 briefly illustrates the traditional alerting system.
Figure 3:
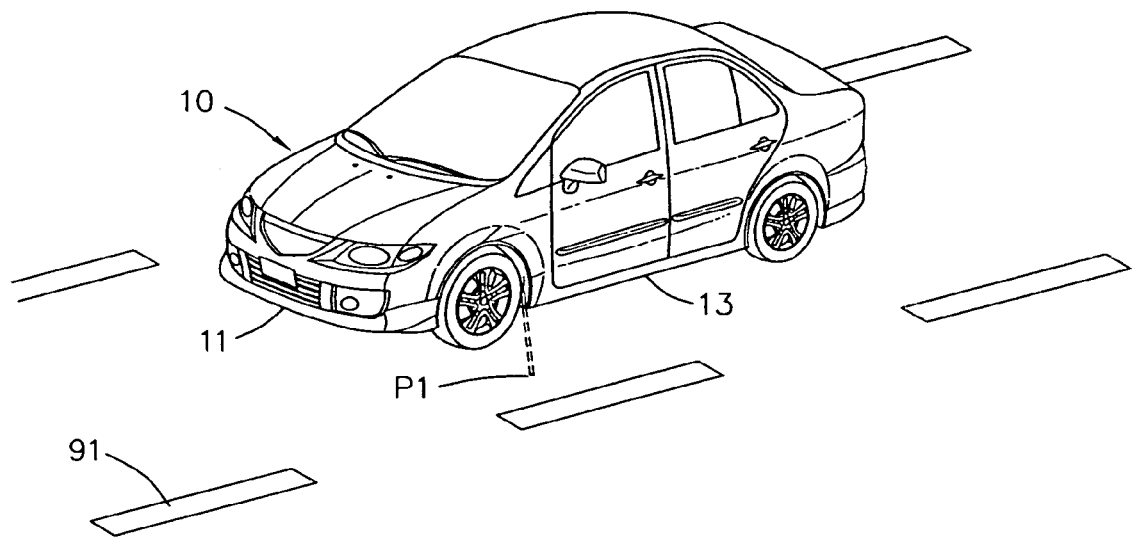
FIG. 3 is a perspective view of the first preferred embodiment of the present invention.
Figure 4:
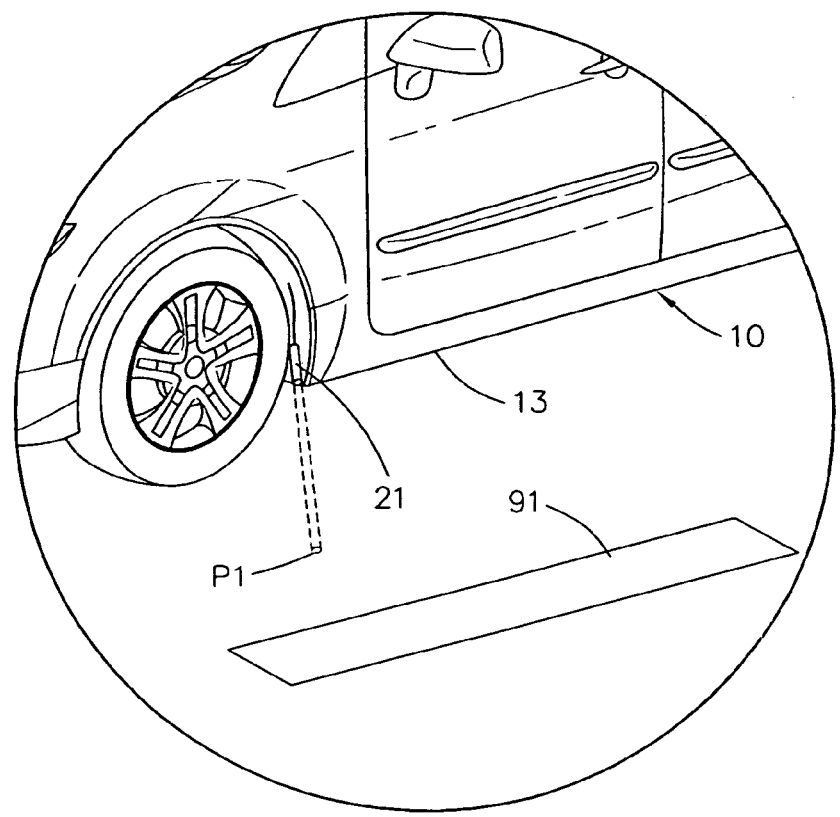
FIG. 4 is an enlarged view of a selected portion of FIG. 3.
Figure 5:
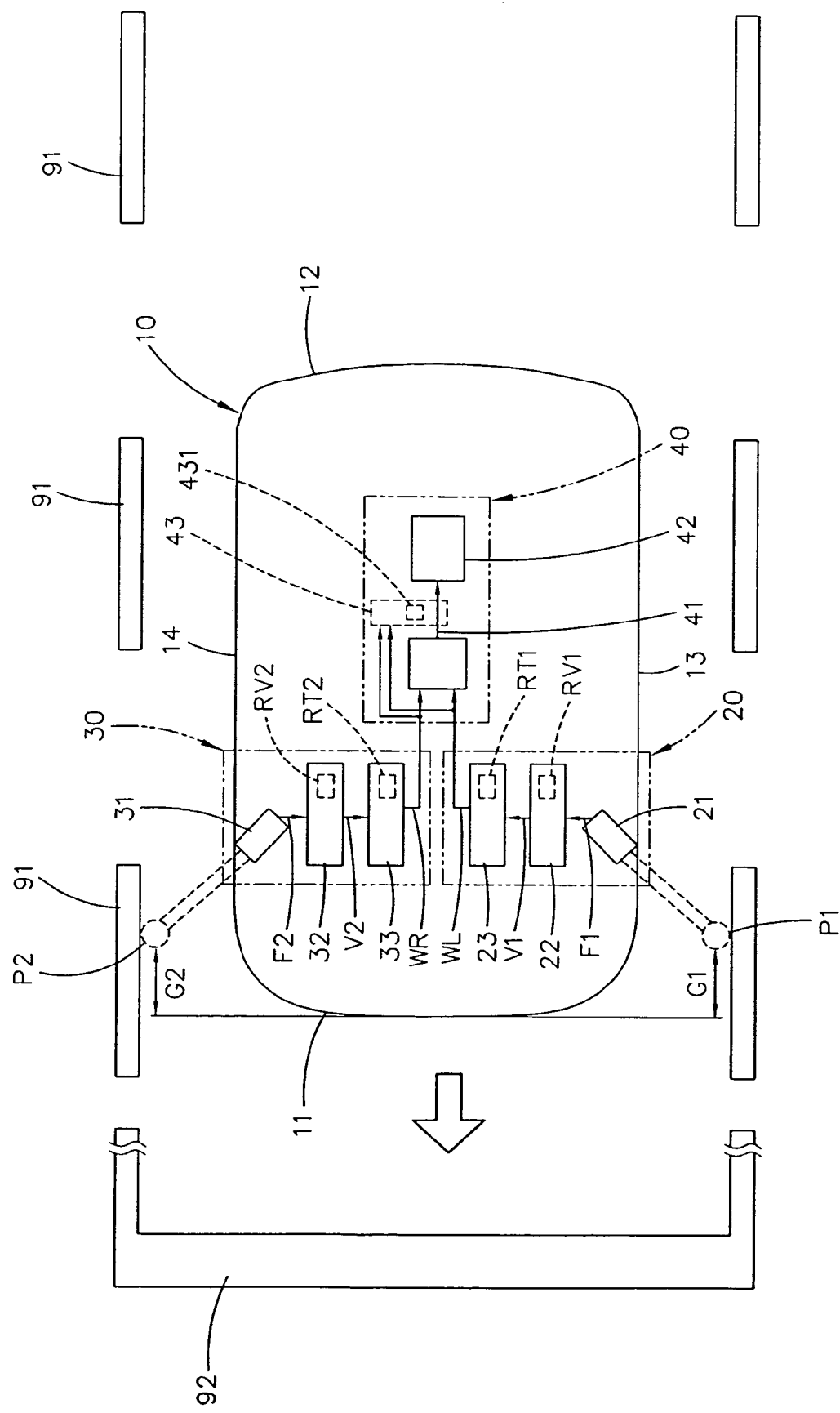
FIG. 5 shows the system of the first preferred embodiment of the present invention.

Referring to FIGS. 3 to 5, the first preferred embodiment of this invention is shown. The present invention is an alerting system of a vehicle deviating from its traffic lane. Such vehicle 10 (for example, an automobile) has a front edge 11, a rear edge 12, a left edge 13 and a right edge 14. This alerting system comprises:

at least one left-side determining device 20, each left-side determining device 20 including:

[a] a first light intensity detector 21 for detecting a light intensity of a first zone P1 and converting into a first light intensity signal so as to obtain a first light intensity signal function F1 when a time passes;

[b] a first light intensity variation judging module 22 for reading the first light intensity signal function F1 and outputting a first variation signal V1 within a preset time, if a condition that the first light intensity signal function F1 varying over a first variation limit RV1 is true, then an output of the first variation signal V1 being ON, otherwise an output of the first variation signal V1 being OFF;

[c] a first misjudging preventing module 23 for reading the first variation signal V1 and output a left-side deviation signal WL, if the first variation signal V1 keeping ON longer than a first comparison time RT1, then an output of the left-side deviation signal WL being ON, otherwise an output of the left-side deviation signal WL being OFF;

at least one right-side determining device 30, each right-side determining device 30 including:

[a] a second light intensity detector 31 for detecting a light intensity of a second zone P2 and converting into a second light intensity signal so as to obtain a second light intensity signal function F2 when a time passes;

[b] a second light intensity variation judging module 32 for reading the second light intensity signal function F2 and outputting a second variation signal V2 within a preset time, if a condition that the second light intensity signal function F2 varying over a second variation limit RV2 is true, then an output of the second variation signal V2 being ON, otherwise an output of the second variation signal V2 being OFF;

[c] a second misjudging preventing module 33 for reading the second variation signal V2 and output a right-side deviation signal WR, if the second variation signal V2 keeping ON longer than a second comparison time RT2, then an output of the right-side deviation signal WR being ON, otherwise an output of the right-side deviation signal WR being OFF;

a warning device 40 to output a warning signal 41 to activate a warning action 42 when one of the left-side deviation signal WL and right-side deviation signal WR is received.

Moreover, regarding the warning action 42, it is selected from one (or more) item of following items: producing a warning voice, producing a warning light, tightening a seat belt, turning on a direction light, turning on a head light, turning on a telecommunication system to contact with a preset person. In case an accident happens, it can inform one or more specific persons to make any necessary processing steps.

Practically, in order to reduce the possibility that the vehicle 10 just deviates from the middle of two adjacent (and aligned) side lines 91, the quantity of the left-side determining device 20 and the right-side determining device 30. For examples, there are two, three or more devices on each side.

In addition, when the vehicle 10 moves over a cross line 92, the left-side determining device 20 and the right-side determining device 30 will detect it simultaneously. At that moment, a distance G1 between the first zone P1 and the front edge 11 and another distance G2 between the second zone P2 and the front edge 11 are substantially equal. This warning device 40 further includes a cross-line misjudging preventing module 43. If a time difference between the left-side deviation signal WL turns ON and the right-side deviation signal WR turns ON less than a predetermined cross-line comparison time 431, then the warning signal 41 is cancelled so that no warning action 42 is activated. Thus, it will effectively avoid unnecessary warning action 42.

Figure 6:
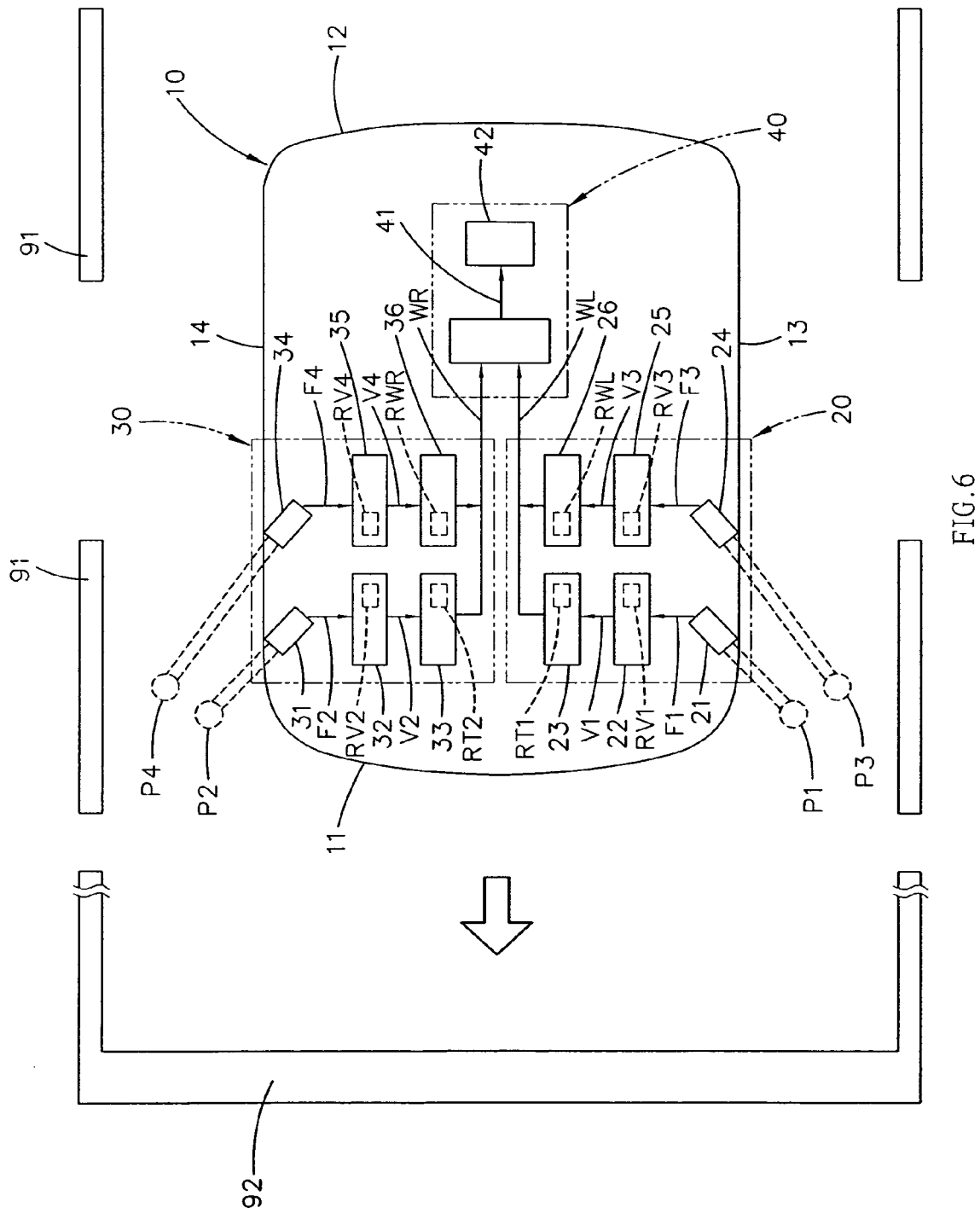
FIG. 6 shows the system of the second preferred embodiment of the present invention.
Figure 7:
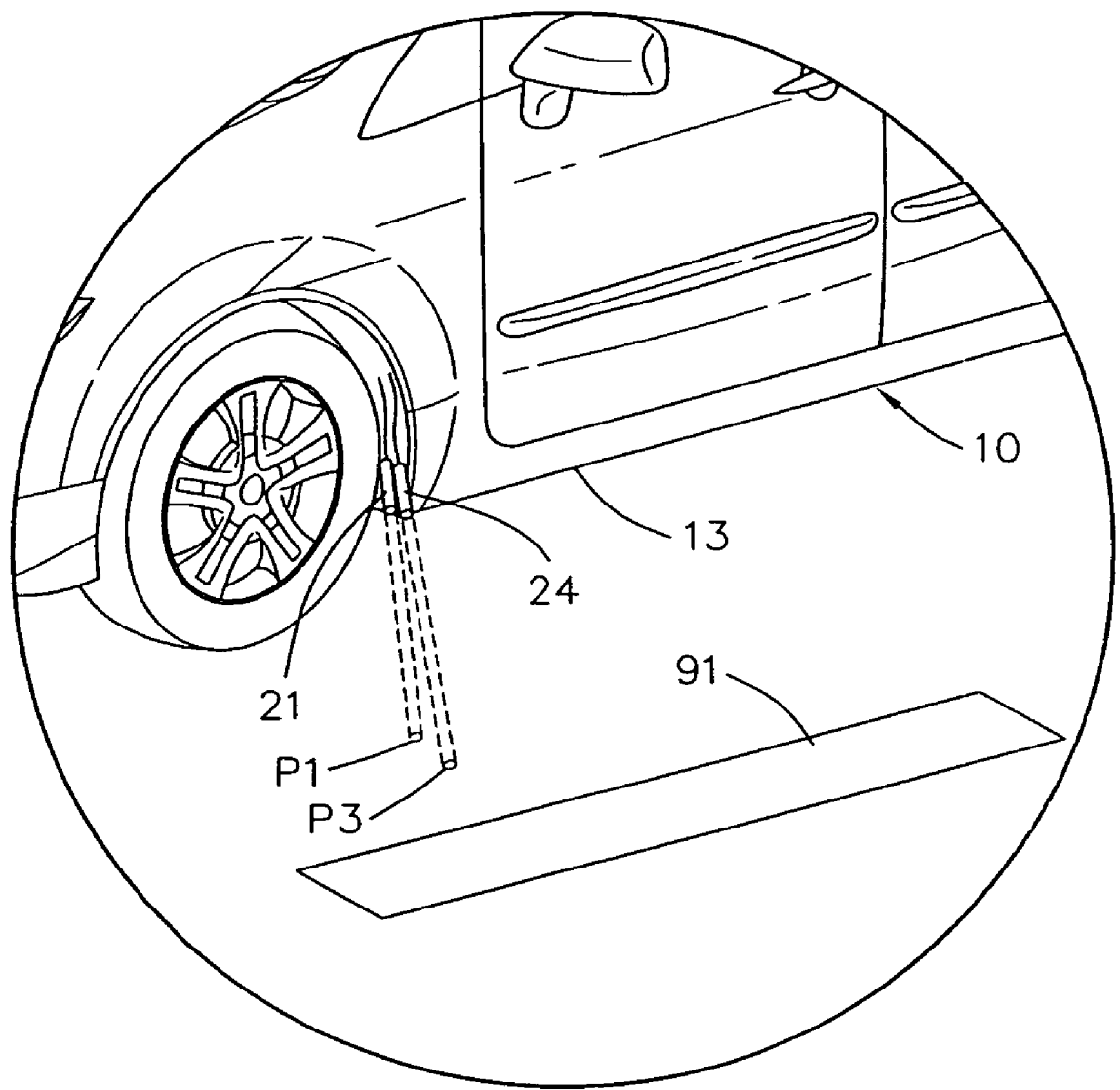
FIG. 7 in an enlarged view of a portion of the second preferred embodiment of the present invention.

As shown in FIGS. 6 and 7, it is the second preferred embodiment of the present invention. For the vehicle 10, it has a front edge 11, a rear edge 12, a left edge 13 and a right edge 14. This invention comprises:

At least one left-side determining device 20 that includes the first light intensity detector 21, the first light intensity variation judging module 22 and the first misjudging preventing module 23 as disclosed above. It further includes:

[d] a third light intensity detector 24 for detecting a light intensity of a third zone P3 and converting into a third light intensity signal so as to obtain a third light intensity signal function F3 when a time passes;

[e] a third light intensity variation judging module 25 for reading the third light intensity signal function F3 and outputting a third variation signal V3 within a preset time, if a condition that the third light intensity signal function F3 varying over a third variation limit RV3 is true, then an output of the third variation signal V3 being ON, otherwise an output of the third variation signal V3 being OFF;

[f] a left-side shadow misjudging preventing module 26, if a time difference between when the first variation signal V1 turning ON and when the third variation signal V3 turning ON is shorter than a predetermined left-side shadow misjudging preventing value RWL, then canceling the left-side deviation signal WL; and Similarly, concerning the at least one left-side determining device 20, it includes the second light intensity detector 31, the second light intensity variation judging module 32 and the second misjudging preventing module 33 as disclosed above. It further includes:

[d] a fourth light intensity detector 34 for detecting a right intensity of a fourth zone P4 and converting into a fourth light intensity signal so as to obtain a fourth light intensity signal function F4 when a time passes;

[e] a fourth light intensity variation judging module 35 for reading the fourth light intensity signal function F4 and outputting a fourth variation signal V4 within a preset time, if a condition that the fourth light intensity signal function F4 varying over a fourth variation limit RV4 is true, then an output of the fourth variation signal V4 being ON, otherwise an output of the fourth variation signal V4 being OFF;

[f] a sight-side shadow misjudging preventing module 36, if a time difference between when the fourth variation signal V4 turning ON and when the fourth variation signal V4 turning ON is shorter than a predetermined right-side shadow misjudging preventing value RWR, then canceling the right-side deviation signal WR. The major function of the second preferred embodiment is to avoid the misjudging cause by shadow.

Figure 8:
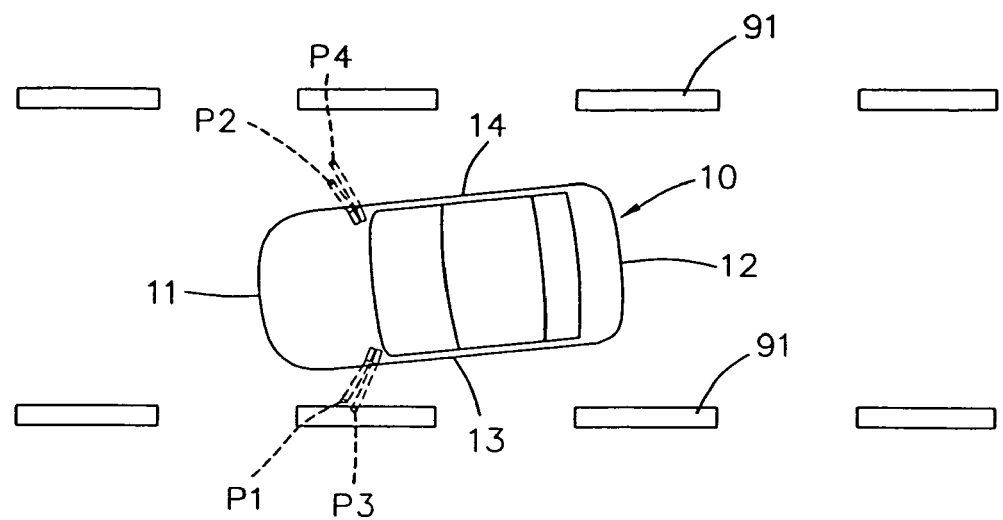
FIG. 8 illustrates the vehicle in the second preferred embodiment deviates to the left.

Referring the FIG. 8, assuming that the light intensity outside the vehicle 10 does not change too much, if the vehicle 10 deviates to the left side of its lane, the outermost third zone P3 becomes bright (because the white paint of the side line 91 is brighter to reflect more light). After a period of short time, the relative inner first zone P1 become bright. There is a time difference between them.

Figure 9:
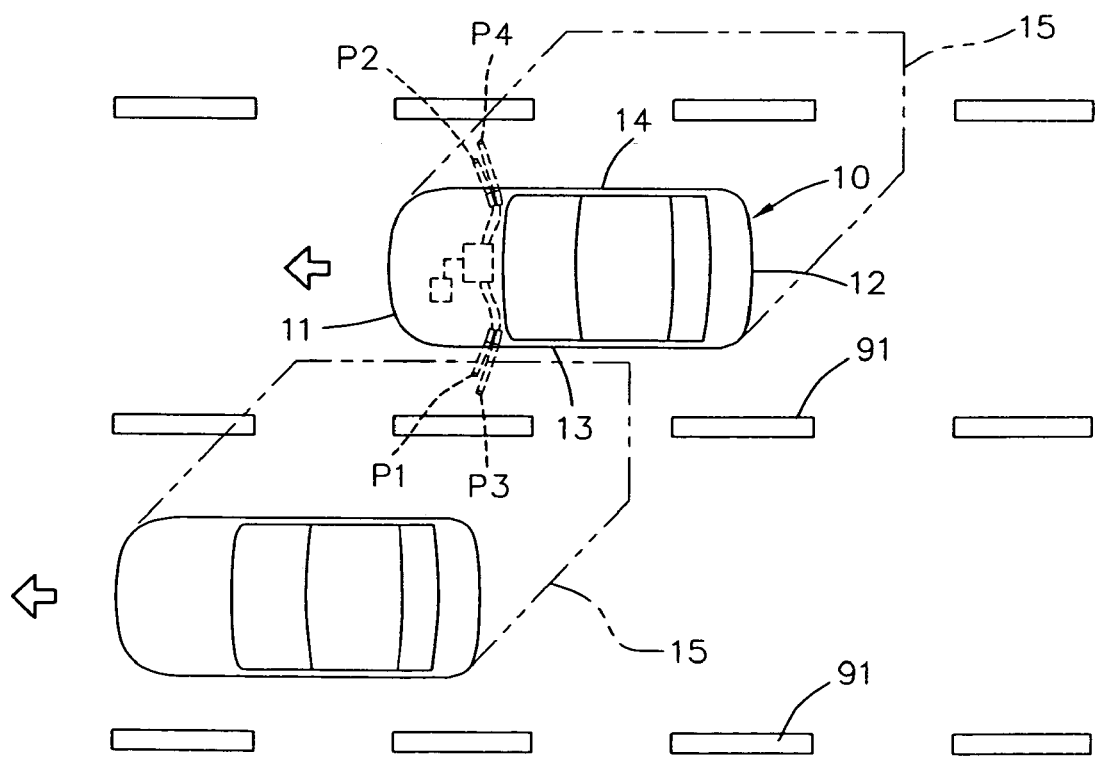
FIG. 9 is a schematic view showing the vehicle is influenced by the shadow.

But, as illustrated in FIG. 9, if there is another fast-moving vehicle on the neighboring lane, there will be a moving shadow zone 15 moves over the first zone P1 and the third zone P3. Meanwhile, the first zone P1 and the third zone P3 will become bright almost simultaneously. Based on this phenomenon, by utilizing the left-side shadow misjudging preventing module 26, the time difference between the moment that the first variation signal V1 turning ON and another moment that the third variation signal V3 turning ON is shorter than a predetermined left-side shadow misjudging preventing value RWL, then the left-side deviation signal WL will be cancelled. Thus, it can significantly reduce the possibility that misjudge caused the moving shadow of the neighboring vehicle.

With regard to the first, second, third and fourth light intensity variation judging modules 22, 32, 25, 35, basically there are at least two types of judging methods.

Figure 10:
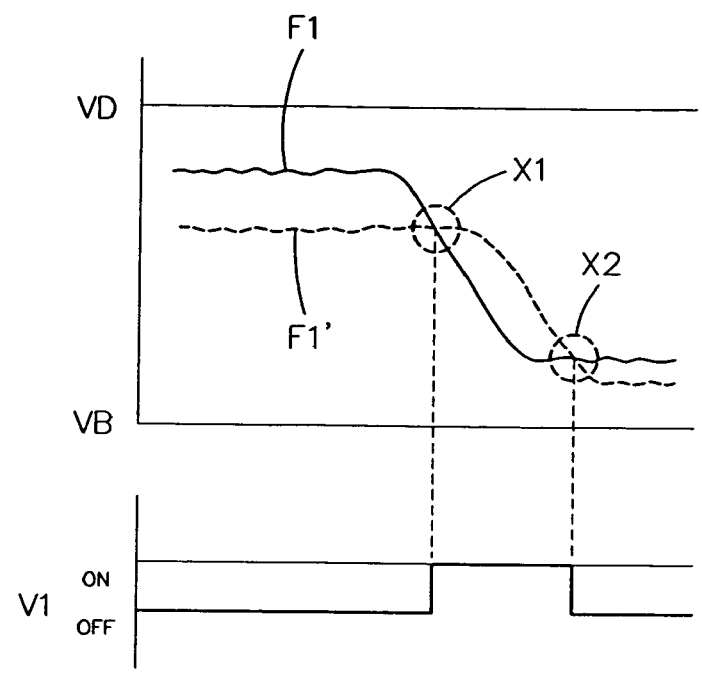
FIG. 10 shows the first method to judge the varying of the light intensity.

[1] To compare it with another phase lagged one. Please see the FIG. 10. If using the first light intensity variation judging module 22 as an example. The label VD means the darkest level. The label VB means the brightest level. The condition that the first light intensity signal function F1 varying over a first variation limit RV1 in the first light intensity variation judging module 22 is defined by: the first light intensity signal function F1 multiplying a first coefficient (such as 0.7 or 0.8) and making a first phase lag (such as 0.03 sec lag) to obtain a first floating function F1'; once the first light intensity signal function F1 crosses (or intersects with) the first floating function F1', the condition that the first light intensity signal function F1 varying over a first variation limit RV1 (such as at the intersections X1, X2) is true. For the second, third and fourth light intensity variation judging modules 32, 25, 35, their operation principles are the same, so there is no need to repeat again.

Figure 11:
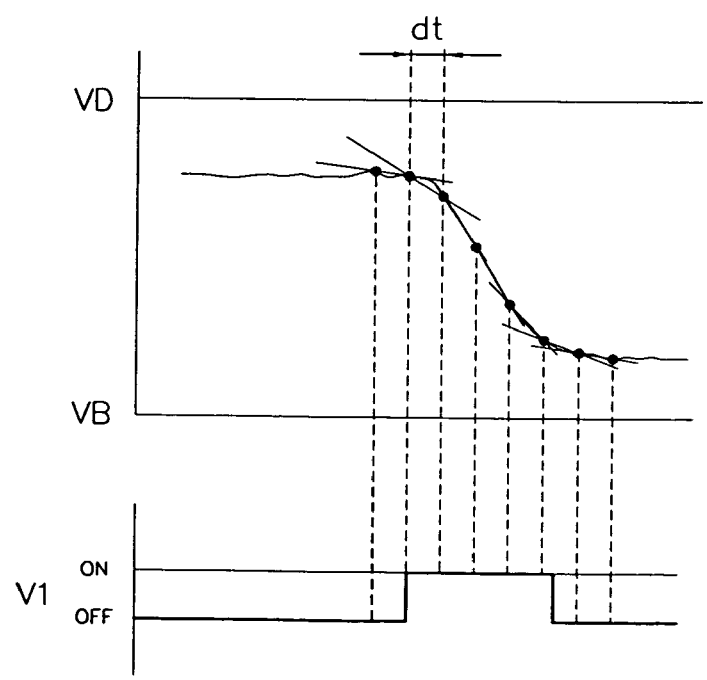
FIG. 11 shows the second method to judge the varying of the light intensity.

[2] To judge by its slope. As shown in FIG. 11, the first light intensity variation judging module 22 is an example (the principles of the second, third and fourth light intensity variation judging modules 32, 25, 35 are the same). The condition that the first light intensity signal function F1 varying over a first variation limit RV1 in the first light intensity variation judging module is defined by: once the slope of first light intensity signal function F1 within a present sampling time (defined as "dt") larger than the first variation limit RV1 (such as larger than 0.5), then the condition that the first light intensity signal function F1 varying over a first variation limit RV1 is true, as shown in FIG. 11.

Figure 12:
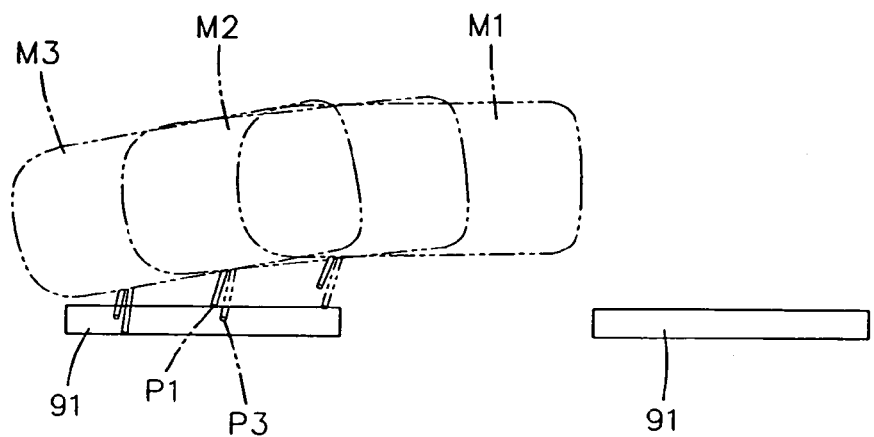
FIG. 12 illustrates the detailed movement and detected information of the second preferred embodiment of the present invention.
Figure 12:
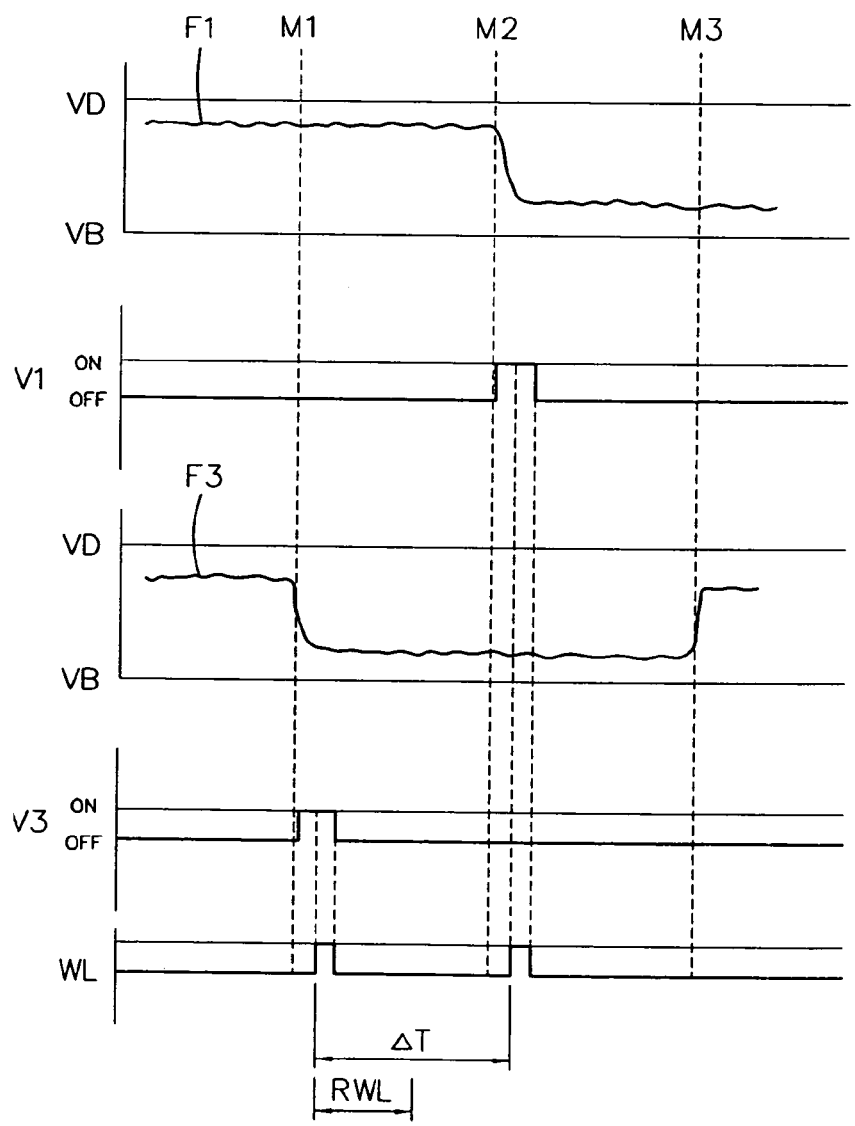

Referring to FIG. 12, in the second preferred embodiment, when a vehicle 10 deviates to the left and crosses the side line 91, the detailed condition can be described as follows.

At the position M1, the third zone P3 just touches the side line 92 but the first zone P1 does not touch the side line 91 yet. Therefore, only the third light intensity signal function F3 becomes bright (from dark). And, the third variation signal V3 turns ON (from OFF) for a period of time. Because the third variation signal V3 keeps ON longer than a first comparison time RT3, then an output of the left-side deviation signal WL is ON At the position M2, the first zone P1 just touches the side line 91 and the third zone P3 still remains inside the side line 91. So, the first light intensity signal function F1 becomes bright (from dark) and the first variation signal V1 turns ON (from OFF) for a while. Because the first variation signal V1 keeps ON longer than a first comparison time RT1, then an output of the left-side deviation signal WL becomes ON. Thus, it outputs a left-side deviation signal WL. But, please note there is left-side shadow misjudging preventing module 26. Because the time difference Δ T between the moment that the first variation signal V1 turns ON and another moment that the third variation signal V3 turns ON is not shorter than a predetermined left-side shadow misjudging preventing value RWL, it still generates a left-side deviation signal WL to the warning device 40.

At the position M3, the third intensity signal function F3 becomes bright (from dark). It will not influence this system.

Figure 13:
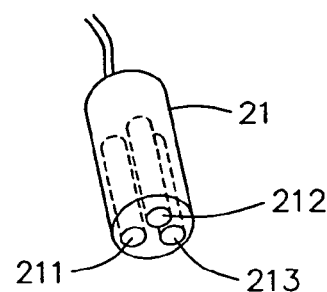
FIG. 13 shows the inner structure of the first light intensity detector.

In addition, as shown in FIG. 13, it is the first light intensity detector 21. Assume that the brightest level is 0 Volt and the darkest level is 12 Volts. It can be composed by three photodetectors 211, 212, 213 to covering three voltage ranges, such as the brighter range (0 to 2 V), the middle range (2 to 10 V), and the darker range (10 to 12 V) respectively. Each photodetector has a suitable amplifying rate. Thus, the entire sensibility and precision of the first light intensity detector 21 can be raised.

Figure 14:
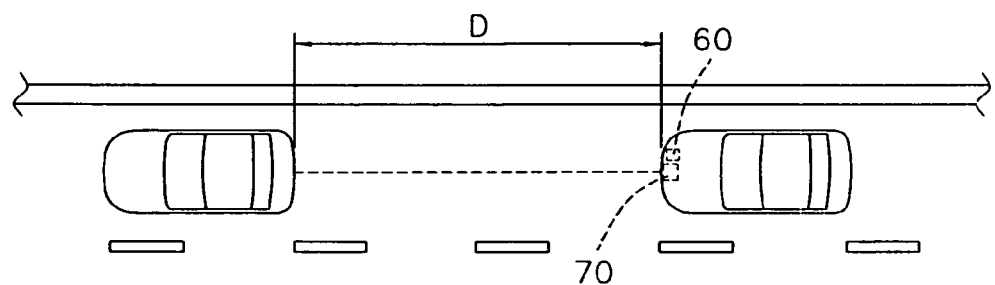
FIG. 14 illustrates the vehicle that can keep certain distance with a front car.
Figure 14:
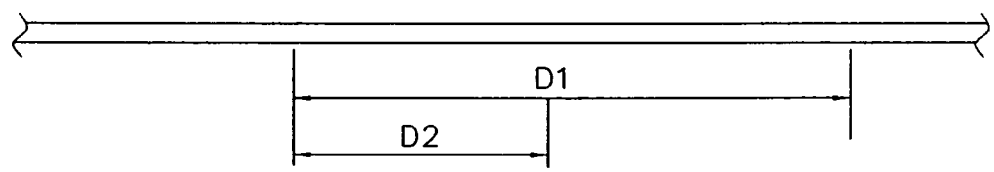

Of course, in order to avoid the collision with another car ahead, as shown in FIG. 14, this invention can further comprise:

a front car distance detector 70 for detecting a front car distance D to a front car ahead, when the front car distance D is larger than a first distance D1, then this vehicle 10 accelerates; when the front car distance D is shorter than a second distance D2, then this vehicle 10 decelerates. Therefore, it can automatically keep a proper and safe distance behind a front car.

Figure 15:
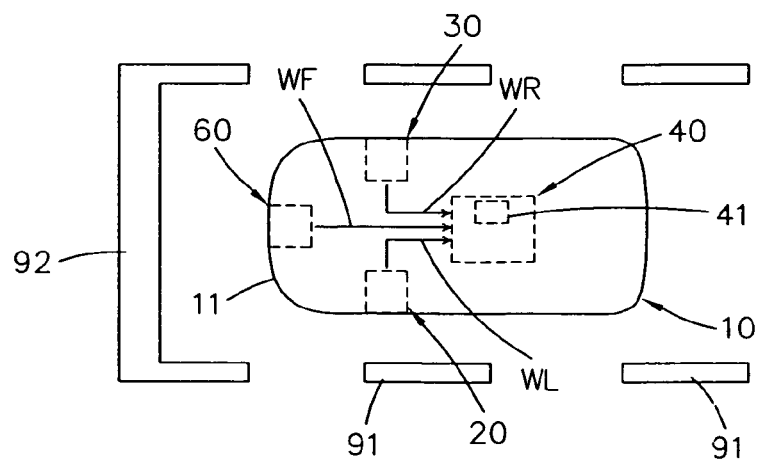
FIG. 15 shows an auxiliary judging device of the present invention.

Referring to FIG. 15, no matter for the fist or the second preferred embodiment, an auxiliary judging device 60 can be mounted on the front edge 11. When it detect there is a cross line 92 (with white paint) ahead, a front line pressing signal WF will be sent to a front line pressing misjudging module 43 of the warning device 40. Once the vehicle 10 moves over the front line 92, it will receive the front line pressing signal WF first, and then almost simultaneously receive both the left-side and right-side deviation signals WL, WR. Thus, this time difference can be used to determine whether this vehicle 10 moves over a front line 92 or not.

Finally, if the driver of the vehicle 10 turns on the direction light (preparing to change the lane), the later detected left-side or right-side deviation signals WL, WR should be ignored. Under this circumstance, no warning is necessary. It can be achieved by computer software or an electric circuit.

Thus, the advantages and functions of the present invention can be summarized as follows:

[1] Having a changeable judging base depending on its environment. This invention utilized a changeable or floating judging method (no matter by the phase lag method or by the slope method). Even it moves in a brighter or a darker environment, the judging base is changing accordingly. Thus, this system is more precise and more reliable.

[2] Lowering the possibility of misjudging caused by shadow. This invention can use two detectors (such as the first and the third light intensity detectors) on one side to detect the light intensities of two close zones. By checking their varying condition and time difference therebetween, this invention can distinguish it presses on the side line or just presses on a shadow caused by other object. Therefore, it significantly reduces the possibility of misjudging.

[3] Having several post-processing steps. In this invention, its warning action 42 can be selected from at least one of producing a warning voice, producing a warning light, tightening a seat belt, turning on a direction light, turning on a head light, turning on a telecommunication system to contact with a preset person. In case an accident happens, it can inform a specific person to make any necessary post-processing steps.

The above embodiments are only used to illustrate the present invention, not intended to limit the scope thereof. Many modifications of the above embodiments can be made without departing from the spirit of the present invention.

What is claimed is:

1. An alerting system of a vehicle deviating from its traffic lane, said vehicle having a front edge, a rear edge, a left edge and a right edge, said alerting system comprising:
at least one left-side determining device, each left-side determining device including:
[a] a first light intensity detector for detecting a light intensity of a first zone and converting into a first light intensity signal so as to obtain a first light intensity signal function when a time passes;
[b] a first light intensity variation judging module for reading said first light intensity signal function and outputting a first variation signal within a preset time, if a condition that said first light intensity signal function varying over a first variation limit being true, then an output of said first variation signal being ON, otherwise an output of said first variation signal being OFF;
[c] a first misjudging preventing module for reading said first variation signal and output a left-side deviation signal, if said first variation signal keeping ON longer than a first comparison time, then an output of said left-side deviation signal being ON, otherwise an output of said left-side deviation signal being OFF;
at least one right-side determining device, each right-side determining device including:
[a] a second light intensity detector for detecting a light intensity of a second zone and converting into a second light intensity signal so as to obtain a second light intensity signal function when a time passes;
[b] a second light intensity variation judging module for reading said second light intensity signal function and outputting a second variation signal within a preset time, if a condition that said second light intensity signal function varying over a second variation limit being true, then an output of said second variation signal being ON, otherwise an output of said second variation signal being OFF;
[c] a second misjudging preventing module for reading said second variation signal and output a right-side deviation signal, if said second variation signal keeping ON longer than a second comparison time, then an output of said right-side deviation signal being ON, otherwise an output of said right-side deviation signal being OFF;
a warning device to output a warning signal to activate a warning action when one of said left-side deviation signal and right-side deviation signal is received,
wherein said condition that the first light intensity signal function varying over a first variation limit in said first light intensity variation judging module is defined by: said first light intensity signal function multiplying a first coefficient and making a first phase lag to obtain a first floating function; once said first light intensity signal function crossing said first floating function, said condition that said first light intensity signal function varying over a first variation limit being true; and said condition that said second light intensity signal function varying over a second variation limit in said second light intensity variation judging module is defined by: said second light intensity signal function multiplying a second coefficient and making a second phase lag to obtain a second floating function; once said second light intensity signal function crosses said second floating function, said condition that said second light intensity signal function varying over a second variation limit is true.

2. An alerting system of a vehicle deviating from its traffic lane, said vehicle having a front edge, a rear edge, a left edge and a right edge, said alerting system comprising:
at least one left-side determining device, each left-side determining device including:
[a] a first light intensity detector for detecting a light intensity of a first zone and converting into a first light intensity signal so as to obtain a first light intensity signal function when a time passes;
[b] a first light intensity variation judging module for reading said first light intensity signal function and outputting a first variation signal within a preset time, if a condition that said first light intensity signal function varying over a first variation limit being true, then an output of said first variation signal being ON, otherwise an output of said first variation signal being OFF;
[c] a first misjudging preventing module for reading said first variation signal and output a left-side deviation signal, if said first variation signal keeping ON longer than a first comparison time, then an output of said left-side deviation signal being ON, otherwise an output of said left-side deviation signal being OFF;
at least one right-side determining device, each right-side determining device including:
[a] a second light intensity detector for detecting a light intensity of a second zone and converting into a second light intensity signal so as to obtain a second light intensity signal function when a time passes;
[b] a second light intensity variation judging module for reading said second light intensity signal function and outputting a second variation signal within a preset time, if a condition that said second light intensity signal function varying over a second variation limit being true, then an output of said second variation signal being ON, otherwise an output of said second variation signal being OFF;
[c] a second misjudging preventing module for reading said second variation signal and output a right-side deviation signal, if said second variation signal keeping ON longer than a second comparison time, then an output of said right-side deviation signal being ON, otherwise an output of said right-side deviation signal being OFF;
a warning device to output a warning signal to activate a warning action when one of said left-side deviation signal and right-side deviation signal is received,
wherein said left-side determining device further including:
[d] a third light intensity detector for detecting a light intensity of a third zone and converting into a third light intensity signal so as to obtain a third light intensity signal function when a time passes;
[e] a third light intensity variation judging module for reading said third light intensity signal function and outputting a third variation signal within a preset time, if a condition that said third light intensity signal function varying over a third variation limit being true, then an output of said third variation signal being ON, otherwise an output of said third variation signal being OFF;
[f] a left-side shadow misjudging preventing module, if a time difference between a moment that said first variation signal turning ON and another moment that said third variation signal turning ON is shorter than a predetermined left-side shadow misjudging preventing value, then canceling said left-side deviation signal; and said right-side determining device further including:
[d] a fourth light intensity detector for detecting a right intensity of a fourth zone and converting into a fourth light intensity signal so as to obtain a fourth light intensity signal function when a time passes;
[e] a fourth light intensity variation judging module for reading said fourth light intensity signal function and outputting a fourth variation signal within a preset time, if a condition that said fourth light intensity signal function varying over a fourth variation limit being true, then an output of said fourth variation signal being ON, otherwise an output of said fourth variation signal being OFF;
[f] a sight-side shadow misjudging preventing module, if a time difference between when said fourth variation signal turning ON and when said fourth variation signal turning ON is shorter than a predetermined right-side shadow misjudging preventing value, then canceling said right-side deviation signal, wherein said condition that said third light intensity signal function varying over a first variation limit in said third light intensity variation judging module is defined by: said third light intensity signal function multiplying a third coefficient and making a third phase lag to obtain a third floating function; once said third light intensity signal function crossing said third floating function, said condition that said third light intensity signal function varying over a third variation limit being true; and said condition that said fourth light intensity signal function varying over a fourth variation limit in said fourth light intensity variation judging module is defined by: said fourth light intensity signal function multiplying a fourth coefficient and making a fourth phase lag to obtain a fourth floating function; once said fourth light intensity signal function crossing said fourth floating function, said fourth light intensity signal function varying over a fourth variation limit being true.

* * * * *